Jan. 25, 1955 J. W. JOHNSON 2,700,306
SHORE WAVE RECORDER (DEEP WATER)
Filed June 28, 1954 5 Sheets-Sheet 1

INVENTOR.
JOE W. JOHNSON
BY George Lipkin
George E. Pearson
ATTORNEYS

INVENTOR.
JOE W. JOHNSON

INVENTOR.
JOE W. JOHNSON

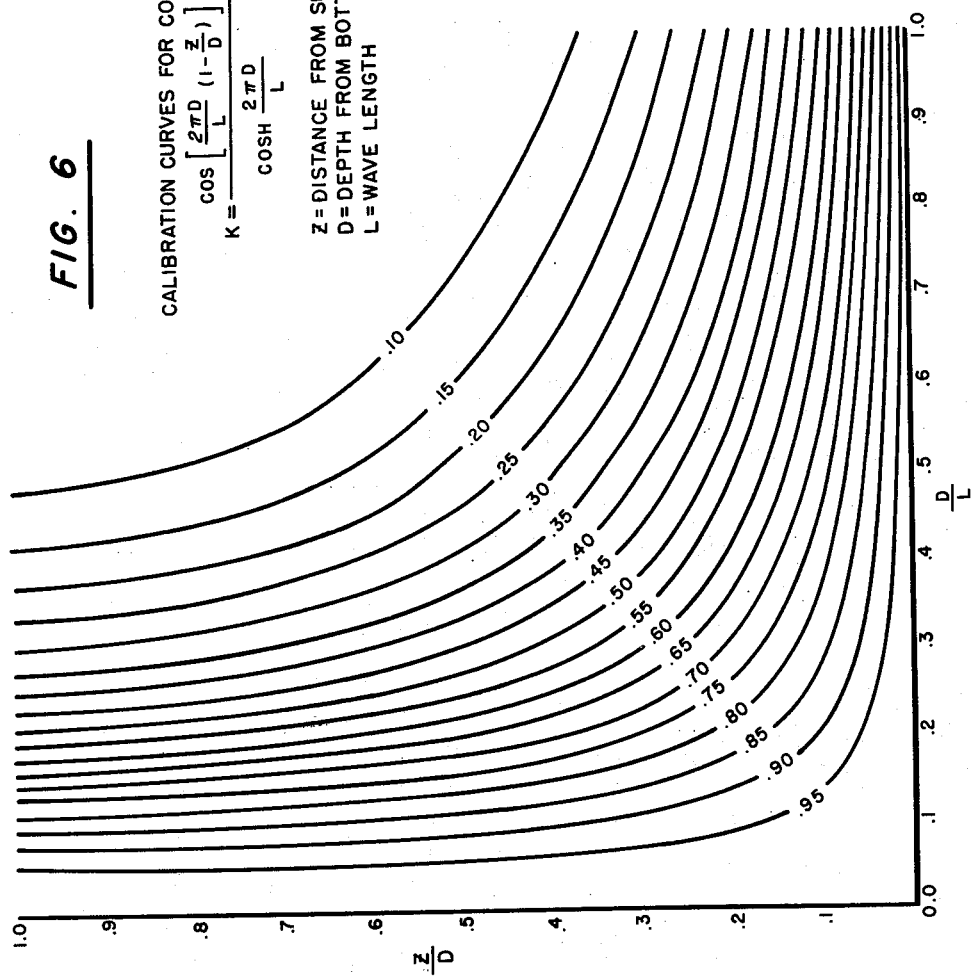

United States Patent Office

2,700,306
Patented Jan. 25, 1955

2,700,306

SHORE WAVE RECORDER (DEEP WATER)

Joe W. Johnson, Berkeley, Calif., assignor to the United States of America as represented by the Secretary of the Navy Application June 28, 1954, Serial No. 439,947

5 Claims. (Cl. 73—300)

The present invention relates to a shore wave recorder and more particularly to a remote control wave height recorder employing the principle of transmitting the wave motion into a proportional change of electrical current by using the wave pressure to compress a bellows whose motion can be transmitted to a coil in a magnetic field, a variable potentiometer, a strain gage or to a variable reluctance element and whose output from the resulting electrical circuit may be recorded on a strip chart recorder, a magnetic tape or photographic recorder.

This invention is useful in obtaining data necessary to the compilation of statistical summaries of wave characteristics at selected points along a coastline. This invention is particularly useful in measuring the long, low swell (also known as forerunners) due to a distant storm and in computing its time of approach, by extracting the forerunners from a complex surface wave pattern. When several years of these records have been assembled and a reliable average condition has been determined, these records will serve as a useful guide for engineers engaged in the planning of coastal and shore protection works. Further, these records will provide adequate data on the characteristics of the waves to be expected for the different seasons at any one point. These records are also useful in making a running comparison with those obtained by the method of forecasting storms from weather charts and to keep a record of the waves of sufficient magnitude arriving at instrument stations.

Various instruments have been used in recording ocean wave pressure fluctuations but none, with the exception of my shallow-water (150 ft. maximum depth) pressure pickup unit disclosed in co-pending application Ser. No. 439,945, have been independent of tidal effects. Furthermore, none have been designed for installation at a depth up to 600 feet below mean sea level such that all waves whose periods are 15 seconds or less do not appear on the record, so that long, low swells due to distant storms can be extracted from the effects of tides and from complex surface wave patterns.

The present invention accomplishes these purposes by the provision of a shore wave recorder consisting of an underwater pressure pick-up unit and a shore based recording milliammeter of the standard Esterline-Angus graphic instrument type, connected by means of a one-inch diameter, three-conductor, submarine armored cable of practically unlimited length (50 mile maximum). Floats mark the spot and buoy up a ⅜ inch wire rope which can be used to retrieve the underwater unit if recovery is necessary.

The present invention provides a pressure record in which the "average" pressure, with which the instant pressure is measured, is continually corrected for tidal changes; has a maximum cable length of 50 miles, can measure waves up to 20 feet in height and can be installed at depths up to 600 feet. In addition to these obvious advantages, the present invention provides accurate results, is effective and efficient in operation with a minimum of maintenance. The pick-up unit will operate submerged up to two years before overhaul is required. In addition, personnel with limited instruction are able to operate the present device.

In operation, two resistances of a Wheatstone bridge circuit are formed by the 750 ohm potentiometer and connected to the shoreward portion of the circuit (the Esterline-Angus recording milliammeter) by means of the three-conductor cable. The relative position of the slide wire on the precision potentiometer is controlled by a cantilever beam, which is subjected by pressure responsive elements to deflection proportional to the difference in the average pressure and the instantaneous pressure due to a passage of the wave or swell. This differential type of instrument provides a pressure record that is independent of tides and, at the same time, will provide accurate results when placed at great depths. The long time average pressure exists in the airdome, which is attached to the pressure element. By producing impedance or flow resistance, the short period pressure fluctuations due to the waves can be filtered out. This impedance consists of felt discs, a material which shows no deterioration when immersed in sea water and is of such magnitude that it takes from 15 to 20 minutes for the pressure to equalize in the airdome after a step function change in the pressure.

The metal bellows hereinafter to be more fully disclosed, is covered by a rubber bellows exposed to sea water and is filled with kerosene so that the sea pressure may be transmitted to the pressure elements without loss of energy. O rings are used to keep sea water out of the pressure unit and a coat of marine varnish is applied to the pressure unit to keep the latter free from marine growth and barnacles.

An object of the present invention is to provide on the spot wave data for offshore construction, to provide wave information to the marine industries and for the design of coastal structures.

Another object is to provide means for tracking and forecasting storms by detecting the forerunners of a swell from a complex pattern of sea surface.

Another object is to provide a wave measuring device which avoids the obscuring effect of small local wind waves and chop and which records only the effect of the larger waves and swells, which are major factors in coastal erosion.

A further object of the invention is the provision of a wave pressure device in which pressure changes due to tides are filtered out to provide a more accurate measuring of wave height by differential pressure measurement.

Still another object is to provide a wave recording instrument that may be placed some distance from shore, in varying depths of water, that will record wave height up to 20 feet, that will detect forerunners of a swell and that does not have to be checked periodically, or maintained by trained personnel.

Other objects and many of the attendant advantages of this invention will be readily appreciated as the same becomes better understood by reference to the following detailed description when considered in connection with the accompanying drawings wherein:

Fig. 6 shows the pressure response curves for the unit placed at any depth.

Figure 4:
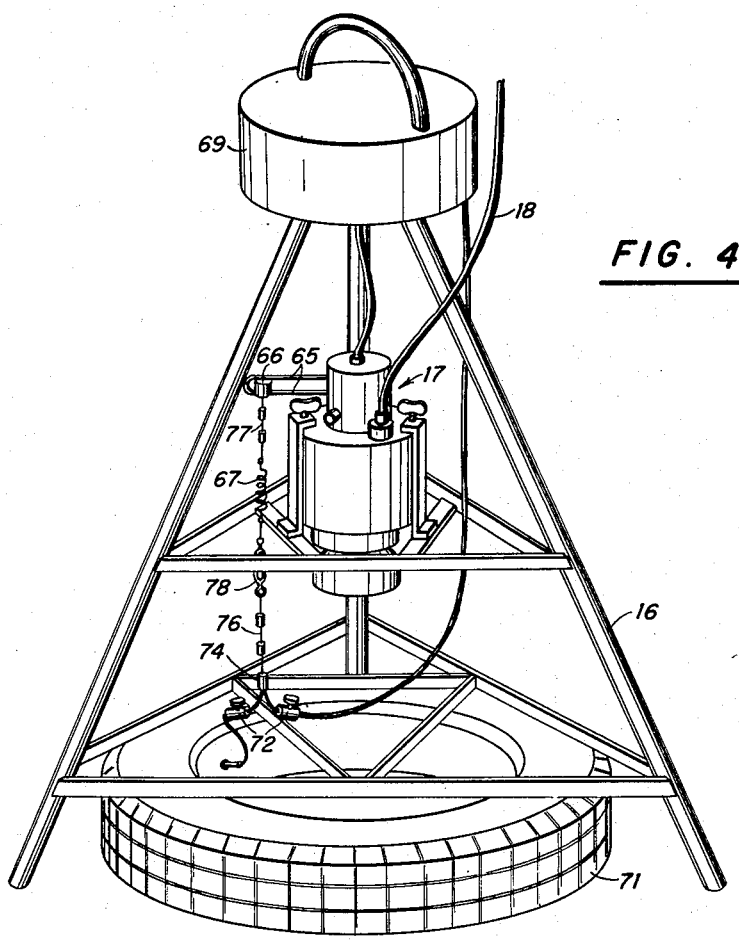
Fig. 4 is a pictorial view of the pickup unit.
Figure 1:
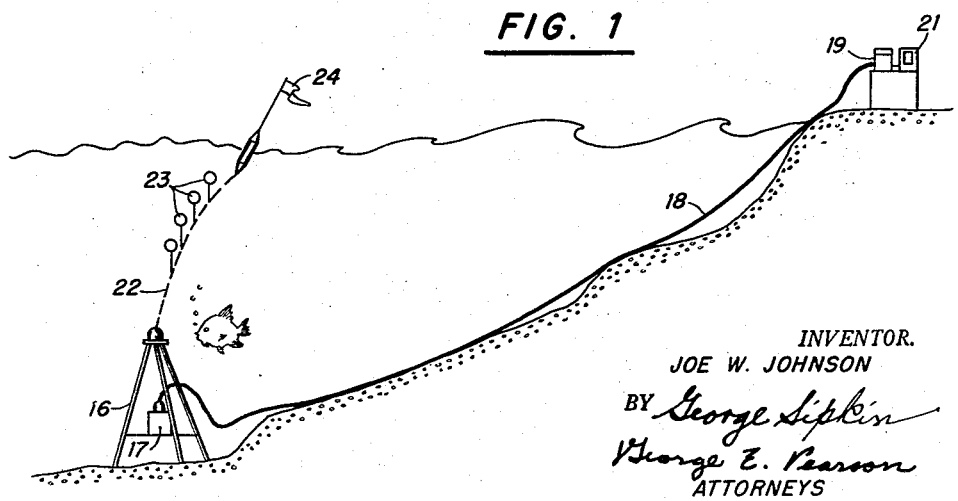
Fig. 1 shows a typical installation layout of an electrical continuous wave recorder.
Figure 2:
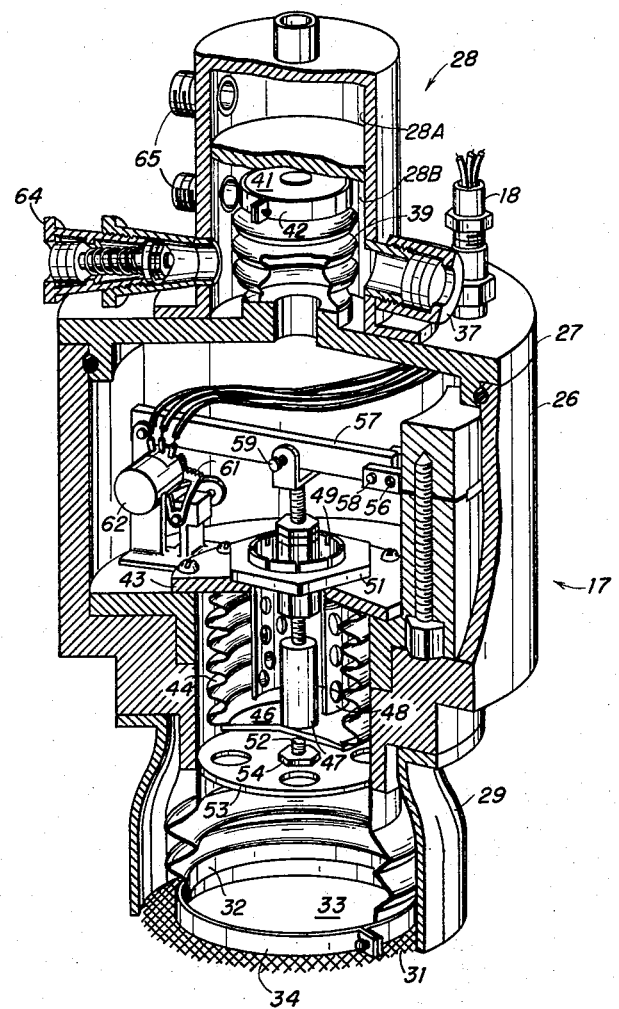
Fig. 2 represents a pictorial view with cut away portions to show inner parts of the shore wave recorder underwater pressure pick-up unit.

Referring now to the drawings, wherein like reference characters designate like or corresponding parts throughout the several views, there is shown in Fig. 1 a typical installation layout of the shore wave recorder comprising a frame 16 supporting the underwater pressure pickup unit 17. A three-conductor armored submarine cable 18 connects the pressure unit to a shore-based bridge and power supply 19 and recording mechanism 21. The buoy and retrieving cable 22 is supported by flotation buoys 23 and marked on the ocean surface by flag buoy 24. Referring now to Fig. 2, casing 26 is enclosed at the top by cover 27 and top dome 28. Extending downwardly from casing 26 is bottom bellows protector 29 to which is attached a screen 31. A bottom rubber bellows 32 is attached to the bottom of casing 26 within the protector 29. The bottom of the bellows is covered by a cap 33 secured by clamp 34 and filled with kerosene 36. An opening is made in the top dome 28 into which is placed felt disc filters 37 or other suitable material such as sintered glass that will retard the flow of sea water 38 into the dome 28. By producing impedance or flow resistance, the short period pressure fluctuations due to smaller waves are filtered out. The impedance of the discs 37 is of such magnitude that a long time pressure exists in the air-dome 28. This pressure adjusts itself for tides so that the influence of tides upon the differential pressure is negligible. Within dome 28 is an opening in cover 27. This opening is covered by a top rubber bellows 39 covered by a cap 41 secured by clamp 42. Mounted within the opening in the bottom of casing 26 and attached to connecting ring 43 is metal bellows 44 with cover 46 to which is attached an adjustable connecting rod 47. The compressing limit of bellows 44 is adjusted by a stop member 48 threadedly fastened to connecting ring 43 and extending downwardly inside the metal bellows 44 to engage the cover 46 when the bellows is compressed. The stop member has slots 49 cut along the top to facilitate its rotation for adjustment. Lock nut 51 holds the stop member securely in place after it has been adjusted. The expansion limit is determined by stop screw 52 contacting the bottom of bellows cover 46. Screw 52 is mounted in a perforated plate 53 secured to the bottom of the opening and is held securely in place after adjustment by lock nut 54.

At one side of casing 26 is mounted a bracket 56 to which is pivotally mounted one end of cantilever beam 57. The pivotal connection may be made through any of several corresponding openings in the brackets and beam by jeweled bearings and pin 58. The selection of the opening is determined by the depth of water at which the pickup unit is to be installed and the sensitivity desired. Pivotally connected intermediate the ends of beam 57 by jeweled bearing and pin 59, connecting rod 47 moves the beam 57 about the axis of pin 58. The free end of beam 57 is connected by means of linkage mechanism 61 to a 750 ohm potentiometer 62. This potentiometer forms two resistances of a Wheatstone bridge circuit and is connected to the shoreward portion of the circuit by means of the three conductor cable 18. The relative position of the slide wire on the precision potentiometer 62 is controlled by beam 57 which is subjected to deflection proportional to the difference in the average pressure and the instant pressure due to the passage of large waves or a long, low swell. The average pressure is exerted on the interior of bellows 44 including the cover 46 by the passage of sea water through the filter discs 37 into dome 28 and around rubber bellows 39. This pressure is transferred with negligible loss to the metal bellows 44 through the medium of kerosene 63 which fills the interior of the unit. The instant pressure is exerted against the bellows cover 46 from the other side by means of the instant pressure being exerted on bellows 32 which transfers the pressure with negligible loss through the medium of kerosene within the bellows to the cover 46. The difference in pressure on the cover 46 actuates the beam 57 through connecting rod 47. The beam 57 in turn moves the slide wire on the potentiometer through the linkage mechanism 61.

Figure 3:
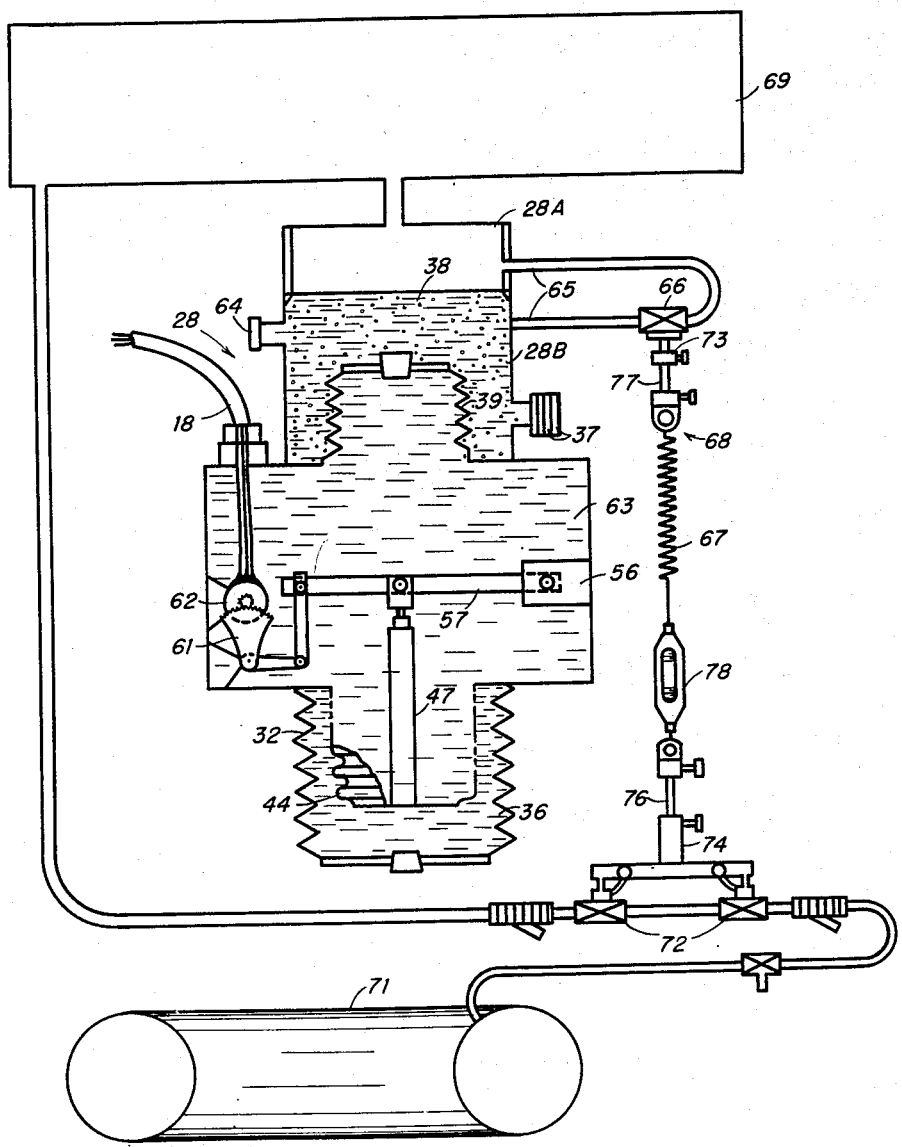
Fig. 3 is a schematic diagram of the underwater pressure pick-up unit.

It will be noted in comparing the pickup unit in the present invention with that of my co-pending application, Ser. No. 349,945, which is designed for a maximum depth of 150 feet, that the operating principle is the same, i. e., using a pressure differential to actuate a sliding arm of a potentiometer in a Wheatstone bridge circuit. However, closer inspection will reveal that the structure carrying out this principle differs in many respects. For instance, kerosine instead of fresh water and air is used. The present device has compression and expansion limits which are adjustable and which permit the bellows to withstand the extreme pressures of greater depth without injury. The adjustable connecting rod 47 and adjustable pivot point of the cantilever beam 57 permit a wider range of actuation of the potentiometer slide wire required in measuring greater depths of sea water. In addition to these differences, special provision must be made to withstand the excessive pressures of deeper water and the rapid change in pressure in raising and lowering the unit. This is done in the present invention through the utilization of a helium filled reservoir, time-release valves, and an emergency pop-off valve to accompany the unit for installation. As shown in the schematic diagram in Fig. 3, the dome 28 is divided into two compartments 28A and 28B. Compartment 28B is filled completely with sea water prior to the lowering operation and has a suitable opening for a spring loaded relief valve 64 which operates only to relieve pressure when raising the instrument. The opening for the filter discs is also in compartment 28B. The passageway 65 between sea water filled compartment 28B and helium filled compartment 28A contains a normally open quick acting spring operated valve 66, held closed by tension spring 67 through a $\frac{3}{32}$ inch diameter magnesium wire four hour delay release 68 as will be hereinafter explained. Upper compartment 28A is connected to a helium filled container 69 which in turn is connected to a helium filled compressible volume tube 71. Between the container 69 and the tube 71 is inserted a normally closed quick acting spring operated valve 72 held open during the lowering operation by the same delay release 68 as will be hereafter explained. The initial charging pressure of the tube 71 is dependent upon the final installation depth. As the apparatus is lowered into the water tube 71 compresses and balances the pressure in container 69 with the ambient increasing pressure of the sea water. The sea water in compartment 28B prevents the metal bellows from being overstrained during the lowering operation. The magnesium wire delay release 68 consists of fastening members 73, 74 to the valves 66 and 72, magnesium wires 76, 77 extending from the fastening members and a tension spring 67 and turn buckle 78 completing the connection from valve 66 to valve 72. The reaction of the sea water weakens the magnesium wire and after a predetermined delay causes it to break, opening the valve 66 and closing valve 72. This cuts off the passage of helium from tube 71 and permits equalization of pressure in compartment 28B with the pressure of the ambient sea water at the depth installed. From time to time pressures due to tides will filter into the compartment through discs 37 as well as effect the pressure on the rubber bellows 32. Thus, the effect of tidal pressures is counteracted and will not be recorded.

The shore recording unit consisting of a bridge and power supply unit 19 and recorder 21 completes the invention. The potentiometer in the underwater pressure pick-up unit forms two sides of a Wheatstone bridge and is connected to the shoreward portion of the circuit by the three conductor cable 18. Since the bridge circuit operates on D. C. voltage, a rectifier and a voltage regulator are incorporated in a common unit with the bridge in order that A. C. or D. C. voltage may be applied.

The pressure versus depth relationship is such that the additional pressure caused by the passage of an ocean wave decreases with the distance below the water surface and becomes nearly negligible for most purposes at a depth equal to or greater than one half the length of the wave. Thus when an instrument of this type is placed at a depth of 600 feet, it would mean that all waves 1200 feet or less in length will be filtered out hydro-dynamically. Since the length of a wave is a direct function of its period $(L_0 = g/2\pi T^2)$, all waves with periods of less than 15 seconds will not be noticed on the record.

*Theoretical treatment for the pressure fluctuations at a given depth*

The shore wave recorder works on the principle of recording pressure fluctuations at the sea bottom and transposing these values to surface wave heights. In order to express the maximum pressure differences as surface wave heights, the relationship of these values with respect to the pertinent variables must be determined.

The theoretical treatment for the pressure depth relationship considers the two dimensional, irrotational motion of an incompressible fluid in a relatively deep channel of constant depth. The fluid motion is assumed to be generated from rest by the action of normal forces; thus, a velocity potential $(\phi)$ exists and will satisfy the La Place equation $$\frac{\delta^2 \phi}{\delta x^2} + \frac{\delta^2 \phi}{\delta z^2} = 0$$

For two dimensional flow, Euler's equation may be reduced to $$\frac{P}{\rho} = \frac{\delta\phi}{\delta t} + gZ\frac{1}{2}\left[\left(\frac{\delta\phi}{\delta x}\right)^2 + \left(\frac{\delta\phi}{\delta Z}\right)^2\right]$$

where Z is the vertical dimension measured positive in the downward direction, P is the pressure at a given depth, and $\rho$ is the density of water. Progressive waves in a long channel with constant width and depth are assumed to be a simple harmonic function of the distance $x$ along the surface.

A velocity potential with suitable boundary conditions may be defined as $$\phi = \frac{ga}{\sigma}\frac{\cosh k(D-Z)}{\cosh kD}\cos(kx-\sigma t)$$

where
$k = 2\pi/L$
$\sigma = 2\pi/T$
$D$ = depth of water
$L$ = wave length
$T$ = wave period
$a$ = a function of wave height, usually equal to one half the height
$g$ = acceleration of gravity
$t$ = time
$C = C/T = \sigma/k$ = wave velocity
$L_0 = \frac{gT^2}{2\pi} = 5.12\,T^2$ $$\frac{\delta\phi}{\delta x} = -\frac{gak}{\sigma}\frac{\cosh k(D-Z)}{\cosh kD}\sin(kx-\sigma t)$$

$$\frac{\delta\phi}{\delta x} = -\frac{gak}{\sigma}\frac{\sinh k(D-Z)}{\cosh kD}\cos(kx-\sigma t)$$

$$\frac{\delta\phi}{\delta t} = ag\frac{\cosh k(D-Z)}{\cosh kD}\sin(kx-\sigma t)$$

For cases where $$\frac{1}{2}\left[\left(\frac{\delta\phi}{\delta x}\right)^2 + \left(\frac{\delta\phi}{\delta Z}\right)^2\right] \ll 1$$

substituting the value of $\phi_t$ into the basic pressure equation yields $$P = \rho gZ + \rho ga\frac{\cosh k(D-Z)}{\cosh kD}\sin(kx-\sigma t)$$

at the surface where $Z=0$, the pressure $P_0$ is $$P_0 = \rho ga\sin(kx-\sigma t)$$

The wave recorder is a differential pressure device which indicates the change from the average hydrostatic pressure; that is, it records $$\Delta P = P - \rho gZ$$

or $$\Delta P = \rho ga\frac{\cosh k(D-Z)}{\cosh kD}\sin(kx-\sigma t)$$

Then the amplitude of the pressure fluctuation $\Delta P$ at a depth of Z expressed as a ratio to the amplitude of the corresponding surface pressure fluctuation $\Delta P_0$ is $$\frac{\Delta P}{\Delta P_0} = \frac{\cosh k(D-Z)}{\cosh kD} = \frac{\cosh\frac{2\pi D}{L}\left(1-\frac{Z}{D}\right)}{\cosh\frac{2\pi D}{L}}$$

Let H be the height of a wave at the surface, and H' the corresponding equivalent height due to the pressure variations at a depth Z. The relationship between H and H' is defined as $$H = \frac{H'}{K}$$

where K is the pressure response factor.

As the pressures are approximately proportional to the heights of water, observing that the compressibility of water is negligible for the depths to be considered, then $$K = \frac{H'}{H} = \frac{\cosh\frac{2\pi D}{L}\left(1-\frac{Z}{D}\right)}{\cosh\frac{2\pi D}{L}}$$

Since a wave recorder usually is placed on the bottom of the ocean, where $Z=D$, then the sub-surface pressure response equation would reduce to $$K = \frac{\Delta P}{\Delta P_0} = \frac{1}{\cosh\frac{2\pi D}{L}}$$

From the above equation it can be seen that for a particular depth of water, the amplitude of fluctuation depends on the wave period because $$\cosh\frac{2\pi D}{L}$$

is a known function of $D/L_0$ with $L_0$ being the deep water wave length $$L_0 = \frac{g}{2\pi}T^2$$

Figure 5:
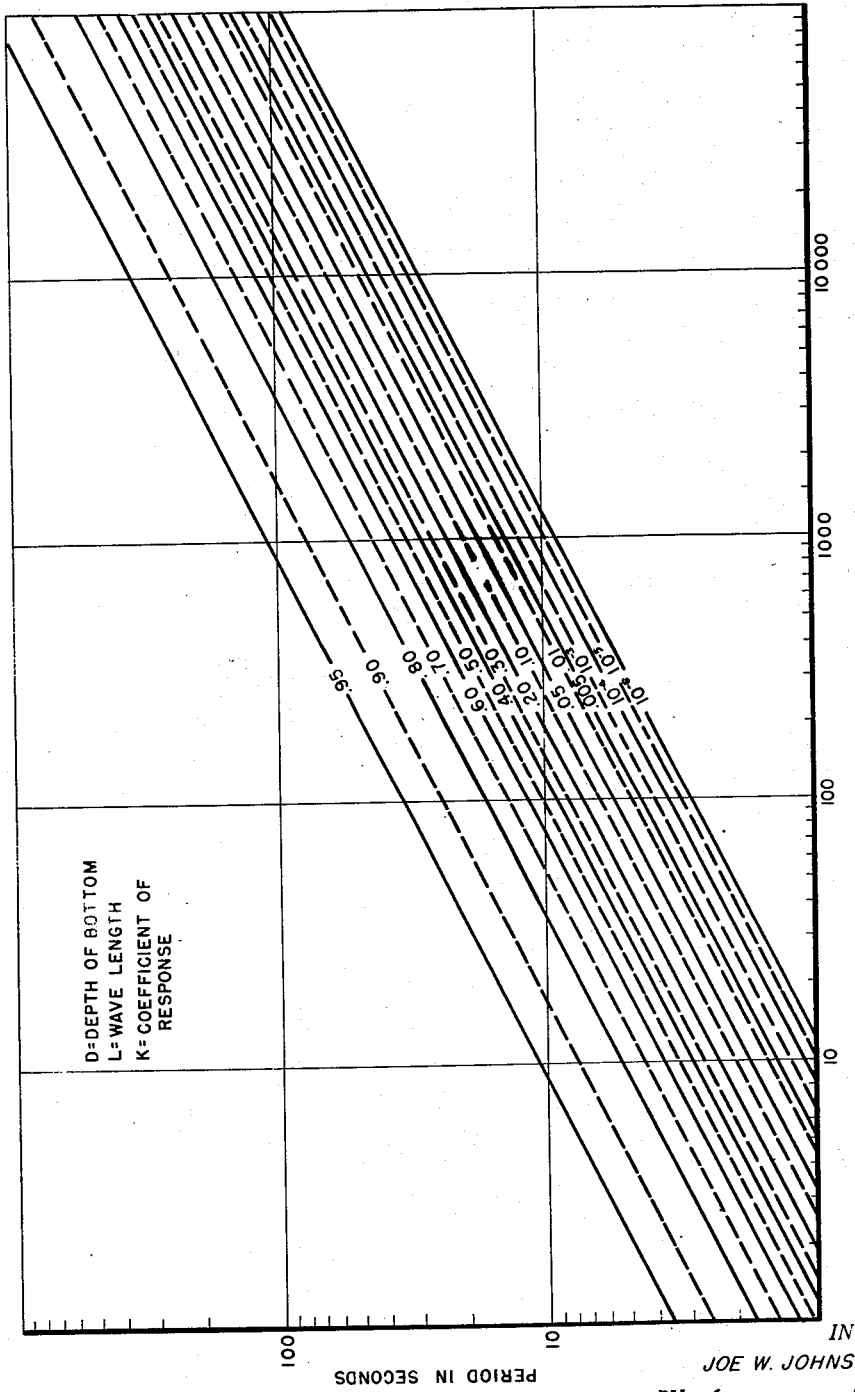
Fig. 5 is a graph showing the pressure response factor as a function of water depth and wave period when the pickup unit is located on the bottom of the ocean.

Figure 5 gives the pressure response factor as a function of water depth and wave period when the instrument is located on the bottom of the ocean. Figure 6 shows the pressure response curves for the instrument to be placed at any depth.

Obviously many modifications and variations of the present invention are possible in the light of the above teachings. It is therefore to be understood that within the scope of the appended claims the invention may be practiced otherwise than as specifically described.

What is claimed is:

1. In pressure measuring apparatus for measuring pressure changes due to the overhead passage of large waves and low swells from points below the surface of the water, an underwater pressure pick-up unit comprising a pressure responsive member, means exerting an average sea pressure on one side of said member, means exerting an instantaneous sea-pressure on the other side of said member, a cantilever beam, said member being connected to said cantilever beam for actuation thereof, said beam being movable in response to the differential pressure exerted on said pressure responsive member, a potentiometer within said unit forming two sides of a Wheatstone bridge and connected to shore based pressure measuring and recording apparatus, said beam connected to and actuating a slide wire on said potentiometer.

2. In pressure measuring apparatus for measuring pressure changes due to the overhead passage of large waves and low swells from points below the surface of the water, an underwater pressure pick-up unit comprising a bellows cover, means exerting an average sea pressure on one side of said bellows cover, means exerting an instantaneous sea-pressure on the other side of said bellows cover, a cantilever beam, said bellows cover being connected to said cantilever beam for actuation thereof, said beam being movable in response to the differential pressure exerted on said bellows cover, a potentiometer forming two sides of a Wheatstone bridge and connected to shore based pressure measuring and recording apparatus, said beam connected to and actuating a slide wire on said potentiometer, said means exerting an average sea pressure on one side of said bellows cover comprising a water tight housing, a first bellows mounted in an opening in said housing and covered by said bellows cover, a non-corrosive belows mounted in a second opening in said housing, said housing and bellows being filled with a low-compression fluid for transmission of pressure from said non-corrosive bellows to said first bellows and bellows cover, a container enclosing said non-corrosive bellows and having means for admitting thereinto sea water having an average sea water pressure for the depth at which said unit is operating.

3. In pressure measuring apparatus as set forth in claim 2, said means in said closed container comprising a filter for retarding the transmission of outside sea pressure fluctuations into said closed container, said filter dampening out temporary pressure fluctuations and passing the pressure effect of tides.

4. In pressure measuring apparatus for measuring pressure changes due to the overhead passage of large waves and low swells from points below the surface of the water, an underwater pressure pick-up unit comprising a bellows cover, means exerting an average sea pressure on one side of said bellows cover, means exerting an instantaneous sea-pressure on the other side of said bellows cover, a cantilever beam, said bellows cover being connected to said cantilever beam for actuation thereof, said beam being movable in response to the differential pressure exerted on said bellows cover, a potentiometer forming two sides of a Wheatstone bridge and connected to shore based pressure measuring and recording apparatus, said beam connected to and actuating a slide wire on said potentiometer, said means exerting an average sea pressure on one side of said bellows cover comprising a closed container and means for admitting thereinto sea water having an average sea water pressure for the depth at which said unit is operating, a normally open valve, a gas filled container connected to said closed container through said normally open valve, a normally closed valve, a gas filled compressible volume tube connected to said gas filled container through said normally closed valve, and retaining means for keeping said normally open valve closed and said normally closed valve open during the lowering of said unit to its installation position.

5. In pressure measuring apparatus as set forth in claim 4, said retaining means consisting of a time delay mechanism including a tension spring and magnesium wire exposed to sea water, the effect of said sea water causing said magnesium wire to break and permitting said valves to return to their normal positions.

References Cited in the file of this patent

UNITED STATES PATENTS

| | | |
|---|---|---|
| 576,208 | Lozier | Feb. 2, 1897 |
| 1,008,566 | Schubert | Nov. 14, 1941 |
| 2,259,867 | Webster | Oct. 21, 1941 |